Feb. 27, 1962  S. ANDRASSY  3,022,781
HEATER
Filed June 11, 1959

INVENTOR.
STELLA ANDRASSY
BY *Philip Mintz*
ATTORNEY.

United States Patent Office 3,022,781
Patented Feb. 27, 1962

3,022,781
HEATER
Stella Andrassy, Princeton, N.J. (Ridge Road, Kingston Post Office, Monmouth Junction, N.J.)
Filed June 11, 1959, Ser. No. 819,774
2 Claims. (Cl. 126—271)

This invention relates to a new and improved solar fluid heater unit. More particularly, this invention relates to a solar water heater unit which is flexible, easily portable, and which will not be damaged in the event of freezing.

Many devices have been developed for utilizing solar energy. One broad class of these devices utilizes solar energy in the form of heat collected at moderate temperatures. This is frequently done by using solar energy to heat water to elevated temperatures in the solar heat collector of such devices. The heated water from such a solar heat collector may be utilized for heating houses, preparing hot water for domestic use, heating swimming pools, etc.

The currently used solar water heaters are usually made of metal, frequently in the form of metallic tubing soldered in a serpentine fashion to the face of a blackened metal plate. Such a structure is unwieldly due to its weight and rigid construction. In addition, fabrication costs are high. In the winter or when there is danger of nocturnal freezing, such a solar water heater must be drained or else antifreeze must be used therein. If antifreeze is used, it is necessary to have an additional heat exchanger for heating water to be used for domestic purposes. This clearly reduces the operating efficiency of such apparatus, and further adds to the costs.

One of the objects of the present invention is to overcome the disadvantages of conventional solar water heaters. Another object of the present invention is to provide a solar fluid heater unit which is light in weight, readily collapsed for transportation and storage, is easily and economically fabricated, and in which the advent of freezing produces no damage.

With the above objects in view, the present invention mainly consists of a solar fluid heater unit having two flexible film members secured to each other adjacent their periphery and further being secured to each other in preselected regions interiorly of the periphery to provide a fluid passageway between the two members. The fluid passageway may be serpentine, or in the form of a pair of headers with a plurality of fluid conduits interconnecting the headers, or of any other configuration.

The novel features which are considered as characteristic of the invention are set forth in particular in the appended claims. The invention itself, however, both as to its construction and its method of operation, together with additional objects and advantages thereof, will be best understood from the following description of a specific embodiment when read with the accompanying drawings, in which:

Figure 1:
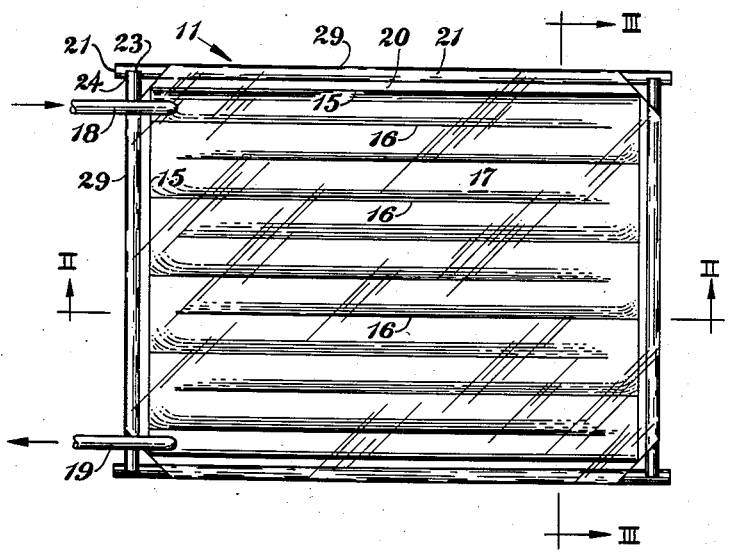
FIGURE 1 is a plan view of a solar fluid heater unit incorporating the principles of this invention.
Figure 2:
FIGURE 2 is a vertical cross section taken along line II—II of FIGURE 1.
Figure 3:
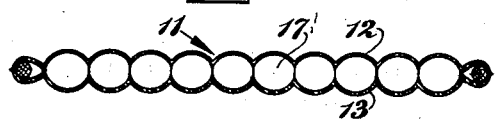
FIGURE 3 is a vertical cross section taken along line III—III of FIGURE 1.

Referring to the drawings, there is shown a solar fluid heater unit 11 constructed according to the principles of this invention.

The solar fluid heater 11 is made of a flexible plastic film which is folded over upon itself so as to form an upper layer 12 and a lower layer 13. Alternatively, layers 12 and 13 may be made from two separate pieces of flexible plastic film, or from a single flattened tube of flexible plastic film.

The plastic film used may be polyethylene, vinylite, polytetrafluoroethylene, polychlorotrifluoroethylene, or any other plastic film which is flexible and which can withstand solar radiations without deterioration.

Layer 12 and layer 13 are secured to each other adjacent their periphery as along line 15, 15 so as to enclose a rectangular region. Layers 12 and 13 are further secured to each other along lines 16, 16, 16 so as to convert the enclosed rectangular region into a serpentine fluid passageway 17. Secured to opposite ends of serpentine fluid passageway 17 are a plastic inlet tube 18 and a plastic outlet tube 19.

For some uses, it may be more desirable to produce a larger volume of warm water rather than a smaller volume of hotter water. For such a use, the enclosed rectangular region may be formed into a tubular passageway providing multiple parallel flow paths. This can be accomplished by securing layer 12 and layer 13 to each other along a series of lines which convert the enclosed rectangular space to the form of two headers along opposite sides of such region connected to each other by a plurality of parallel conduits. The inlet and outlet are respectively connected to opposite ends of the two headers, substantially at diagonally opposed corners of the enclosed rectangular region.

The various joinings of plastic to plastic referred to herein in the construction of the solar water heater unit may be made by heat sealing or by use of suitable adhesives as may be desired.

In order to maximize the collection of solar energy as heat at least one of the plastic film layers 12 and 13 should be highly absorbent of radiant energy. Preferably flexible plastic film layer 13 is made absorbent to radiant energy by painting it black or by incorporating black pigment, such as carbon black, within the plastic composition.

Exteriorly of the line 15, which joins film 12 and film 13 to provide the periphery of the serpentine fluid passageway, there is another joining of plastic film 12 and 13 as at line 29. This provides a hem-like space 20 between lines 15 and lines 29 at the periphery of solar water heater unit 11.

Into each hem-like space 20 is inserted a rod 21. The rods 21 can be made of wood or the like. The four rods 21 are provided at their respective ends with means to temporarily assemble the four rods into a substantially rigid rectangular configuration. Such means may take the form of a slot 23 in one rod into which the butt end 24 of another rod is inserted. In order to facilitate the insertion of rods 21 into hem-like portions 20 and the assembly of such a joint, the corner portions of films 12 and 13 are cut away so as to expose the ends of rods 21.

To use such a solar fluid heater unit for heating water, the plastic film is rolled out upon the ground or other supporting surface and the wooden support members 21 are inserted in the hemlike portions 20 and joined at the corners. This provides desired rigidity. The inlet 18 is connected to a source of flowing water, and outlet 19 is connected to a receptacle for the heated water. The radiant energy in the sunlight impinging upon blackened plastic film layer 13 is converted to heat, raising the temperature of layer 13. The water in the solar water heater unit 11 in contact with layer 13 is thereby also heated. The provision of a serpentine water passageway 17 makes for increased turbulence in the water being heated by increasing its velocity and frequency of changes in direction, thus making for more efficient transfer of heat from blackened layer 13 to the water. Therefore, the sunlight shining upon solar water heater unit 11 will rapidly heat the water contained therein and flowing therethrough.

To disassemble the solar fluid heater unit for storage or for removal to remote locations, the above sequence of steps is reversed. The plastic part of the solar water heater unit can be rolled around the rigid parts, thereby forming a small package for convenience in shipping or storage.

It is thus seen that there has been provided a solar water heater unit which is readily portable, which is light in weight, which is easily and economically fabricated, and which is not subject to damage upon freezing. Yet, the water heater unit is sufficiently rigid for practical use and provides a substantially long water path for the total cross-sectional area of the unit.

The heater unit can be provided with an insulated bottom layer, made of flexible light-weight thermal insulation and a solar radiation transmitting flexible cover to provide an air space on top, to prevent heat losses.

While the invention has been illustrated and described as embodied in a certain particular solar fluid heater unit construction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptions should be and are intended to be comprehended within the meaning and range of equivalents of the following claims.

What is claimed as new and desired to be secured by Letters Patent is:

1. A collapsible solar fluid heater which comprises a single flexible film member folded on itself and secured together at the edges to form a closed container, one side of said folded film member being transparent to pass solar energy and the other side of said folded film member being solar heat absorptive to absorb said solar energy; means formed on the edges of the folded flexible member for receiving interconnecting support members whereby said folded flexible film member is collapsibly supported in a frame formed by said interconnecting support members, the opposite sides of said folded flexible film member being secured together along spaced parallel lines to form a serpentine passageway within said closed container; inlet means connected to said closed container for admitting water into said serpentine passageway; and outlet means connected to said closed container at an opposite end of said serpentine passageway to remove heated liquid from said closed container.

2. Apparatus as defined in claim 1 wherein said means formed on the edges of said folded flexible film member for receiving said interconnected support members are hems formed in the edges of said folded flexible film member.

References Cited in the file of this patent
UNITED STATES PATENTS

| | | |
|---|---|---|
| 254,265 | Bone | Feb. 28, 1882 |
| 1,467,005 | Lawrence | Sept. 4, 1923 |
| 2,274,492 | Modine | Feb. 24, 1942 |
| 2,397,232 | Barnes et al. | Mar. 26, 1946 |
| 2,398,292 | Delano | Apr. 9, 1946 |
| 2,427,262 | Delano | Sept. 9, 1947 |
| 2,489,751 | Candler | Nov. 29, 1949 |
| 2,580,555 | Kroeger | Jan. 1, 1952 |